Figure 1:
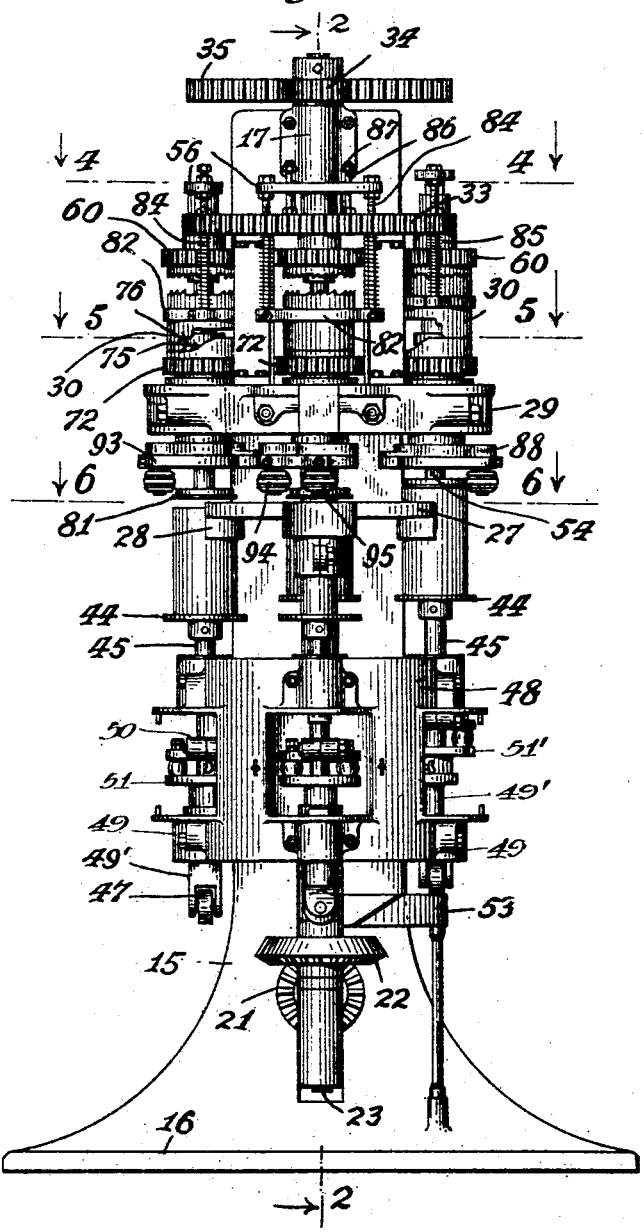

J. BRENZINGER.
CAN HEADING MACHINE.
APPLICATION FILED SEPT. 29, 1913.

1,167,349.

Patented Jan. 4, 1916.
5 SHEETS—SHEET 3.

Attest:

Inventor:
Julius Brenzinger
by
Atty

J. BRENZINGER.
CAN HEADING MACHINE.
APPLICATION FILED SEPT. 29, 1913.

1,167,349.

Patented Jan. 4, 1916.
5 SHEETS—SHEET 4.

Attest:

Julius Brenzinger Inventor:

by

Atty

J. BRENZINGER.
CAN HEADING MACHINE.
APPLICATION FILED SEPT. 29, 1913.

1,167,349.

Patented Jan. 4, 1916.
5 SHEETS—SHEET 5.

Attest:
Edgeworth Greene
Wm. J. Rich

Julius Brenzinger Inventor:
by Fred H. Barrows
Atty

UNITED STATES PATENT OFFICE.

JULIUS BRENZINGER, OF MOUNT VERNON, NEW YORK, ASSIGNOR TO THE MAX AMS MACHINE COMPANY, OF MOUNT VERNON, NEW YORK, A CORPORATION OF NEW YORK.

CAN-HEADING MACHINE.

1,167,349.  Specification of Letters Patent.  Patented Jan. 4, 1916.

Application filed September 29, 1913. Serial No. 792,291.

*To all whom it may concern:*

Be it known that I, JULIUS BRENZINGER, a citizen of the United States, residing at Mount Vernon, in the county of Westchester and State of New York, have invented certain new and useful Improvements in Can-Heading Machines, of which the following is a specification.

This invention relates to machines for securing closures, in the form of caps or covers, to the body portions of sheet-metal containers, such as ordinary tin cans particularly such as are used for packaging fruit and other food stuffs, by what is commonly known as the double-seaming process. Although numerous machines have been devised for the purpose of accomplishing this object, practical use thereof has demonstrated that all are lacking in some of the requirements which recent developments in this art have rendered necessary or desirable. One of the most important of these requirements is that, without sacrificing other desirable features, a can-heading machine shall operate at the greatest possible capacity rate with relation to the space occupied and power and manual attendance required thereby. In the use of machines of this type, it is customary to deliver filled containers to the machine either with their covers loosely in place or with each cover temporarily secured to its respective body portion, or to deliver the covers and the body portions separately to the machine and to assemble them in proper relation to each other immediately prior to performance of the seaming operation. When delivered to the machine, the containers are ordinarily filled to their utmost capacity, or somewhat over-filled, and the speed at which delivery to the machine can be effected and the seaming operation performed is therefore limited in the case of a single machine by the rate at which the filled containers can be transported and otherwise handled mechanically before their covers are permanently secured in place, without undue spilling of their contents or other interference with the operation of the machine or with the satisfactory sealing of the containers.

One of the principal objects of the present invention is the provision of a machine by means of which caps or covers may be secured to the body portions of sheet-metal containers at the greatest possible capacity rate and without undue disturbance of the contents of the containers, the mechanism for accomplishing this purpose being adapted for continuous operation with minimum expenditure of power and a minimum of manual attendance, and being simple, compact and relatively inexpensive.

Further objects are to provide, in so far as possible, against interference with the continuous operation of the machine, due to accidental breakage of parts or excessive wear or clogging thereof, and to insure positiveness in the carrying out of the various steps incident to the complete seaming operation, while at the same time minimizing the number of springs, levers, cams and the like that are now generally required to accomplish that purpose.

I might add, furthermore, that machines for forming can bodies and machines for filling the empty cans and machines for assembling can bodies and heads and delivering these parts in assembled condition to the heading machine, as a rule have a maximum capacity which is greater than that of present known types of double-seaming machines, and the present invention also contemplates, therefore, a double-seaming machine which may be made the last of a chain of machines adapted, from the first to the last, to form the can bodies and heads, fill the open cans, deliver the can heads or tops thereto, feed the filled cans with tops in place thereon to the heading machine, which ejects the filled and sealed can ready for labeling and the market, the heading machine having a capacity which will not render necessary the curtailing of the maximum capacity of another or other machines in the chain.

Still further objects and advantages of my invention will be apparent to those skilled in this art, and will readily be understood from the following specification and claims and the annexed drawings, in which—

Figure 2:
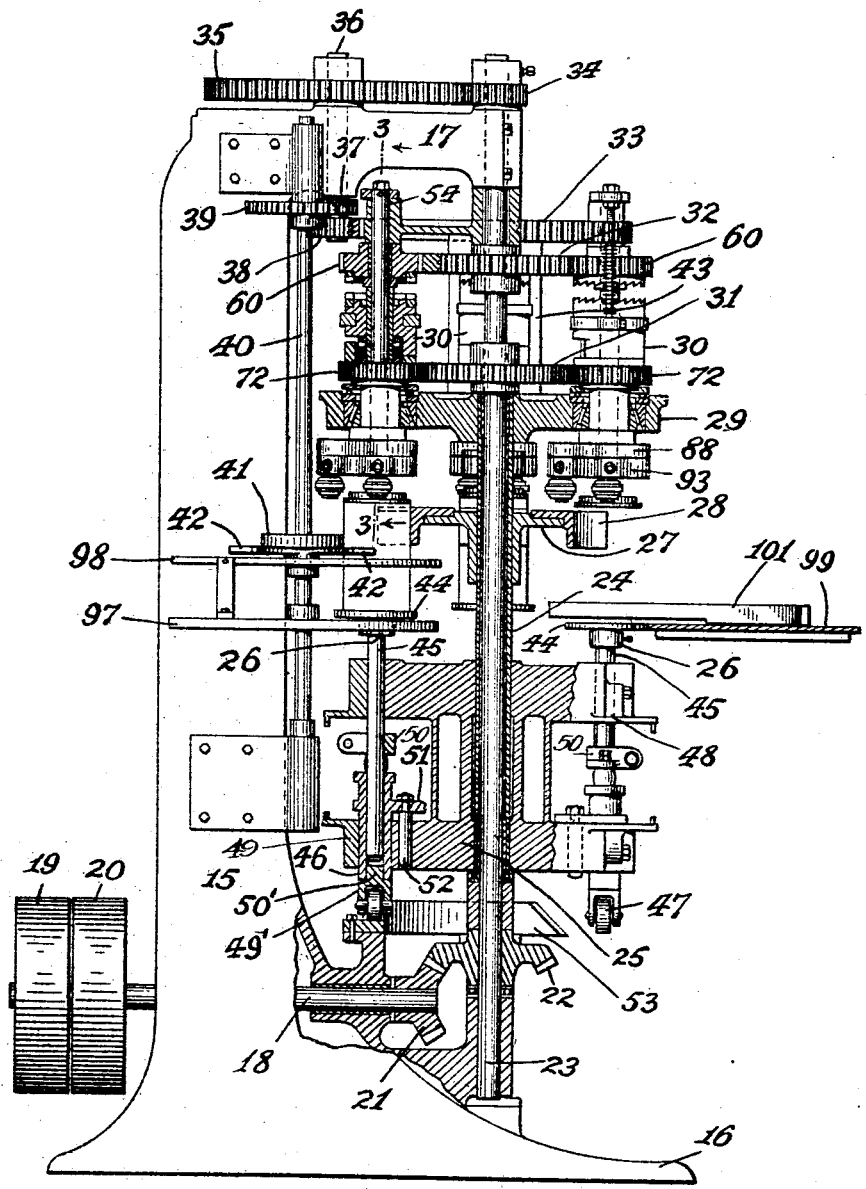
Figure 3:
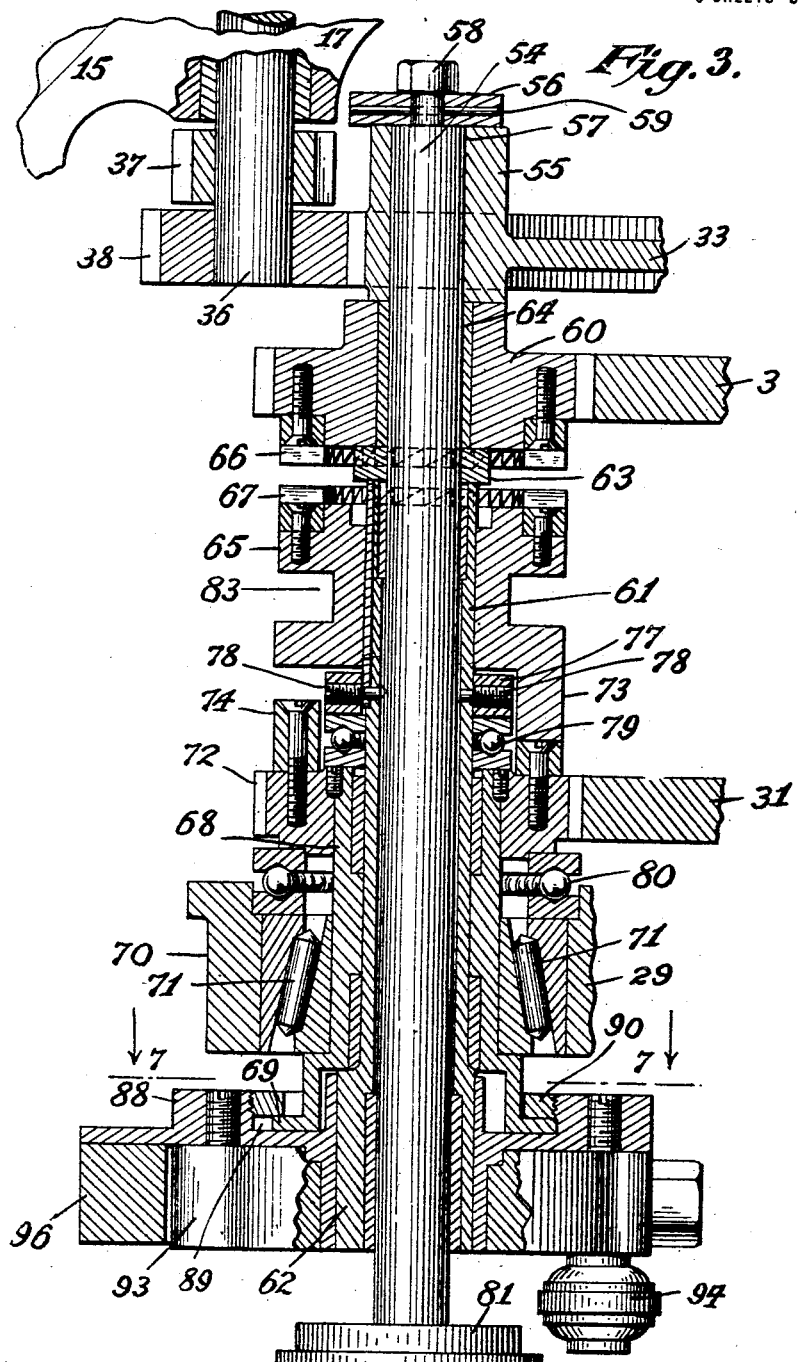
Figure 4:
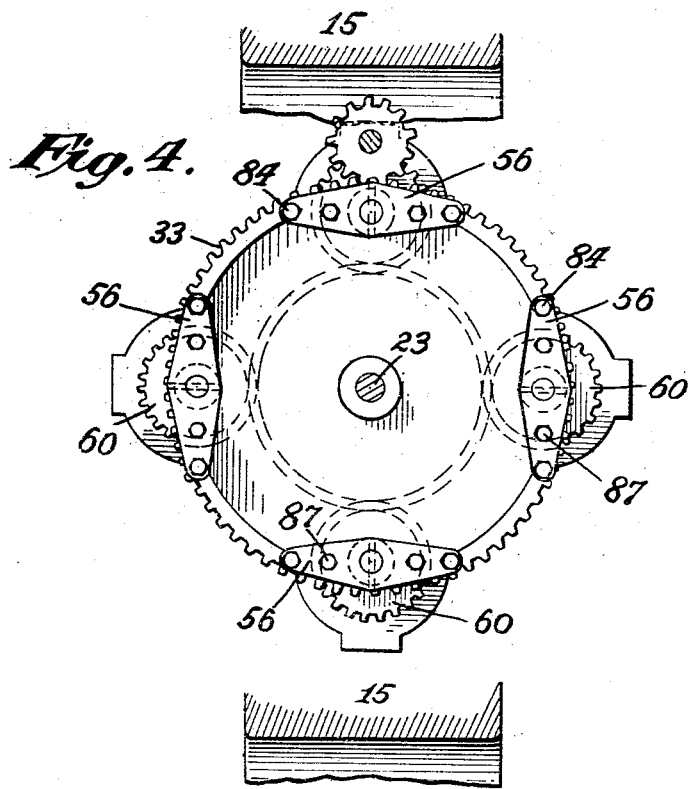
Figure 5:
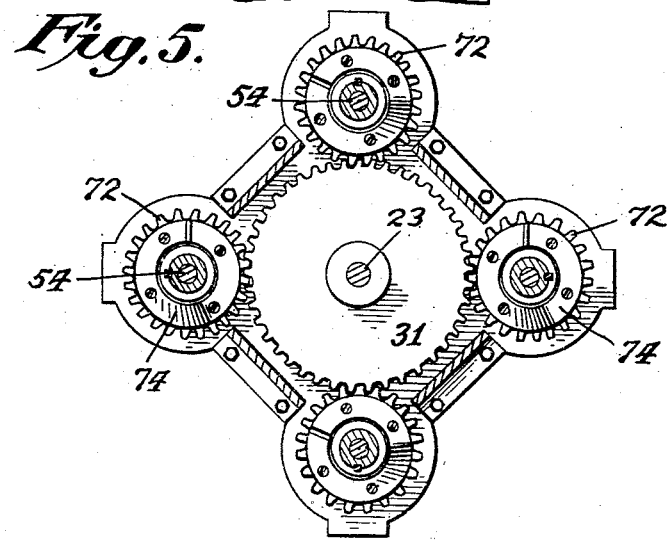
Figure 6:
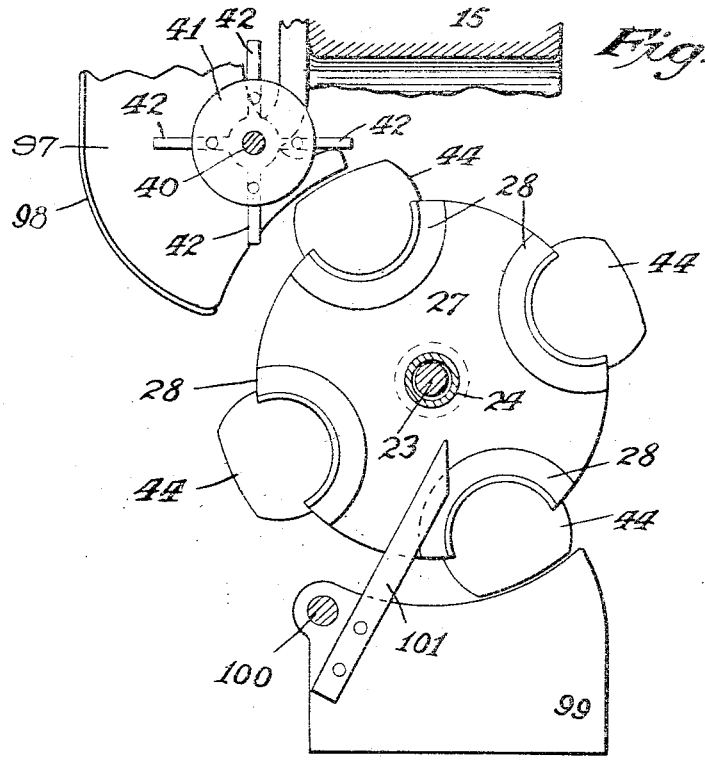
Figure 7:
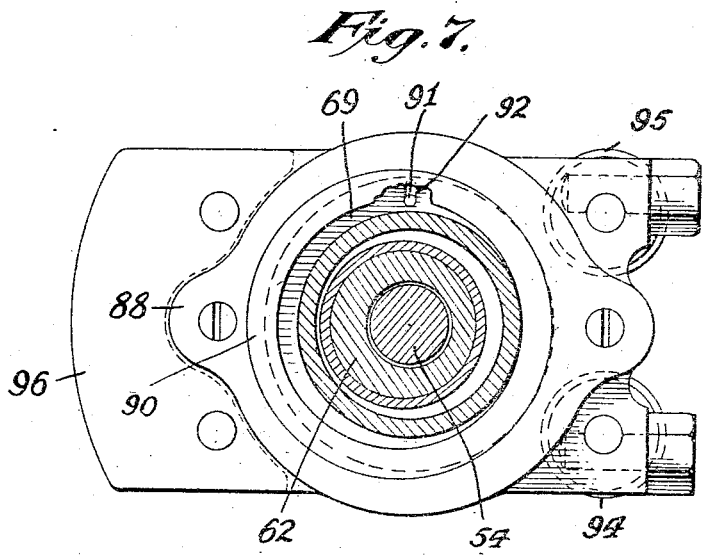

Figure 1 is an end elevation of a machine embodying my invention, omitting the receiving and discharge platforms and the operating devices connected therewith; Fig. 2 is a side elevation thereof, with parts broken away and others shown in vertical section substantially on the line 2—2 of Fig. 1; Fig. 3 is an enlarged vertical section of one of the seaming heads and its actuating mechanism, taken substantially on the line 3—3 of Fig. 2; Figs. 4 and 5 are enlarged horizontal sections taken substantially on the lines 4—4 and 5—5, respectively, of Fig. 1; Fig. 6 is an enlarged sectional plan, taken substantially on line 6—6 of Fig. 1, and Fig. 7 is a sectional plan, taken substantially on line 7—7 of Fig. 3.

Similar numerals of reference are employed to indicate corresponding parts throughout the several figures of the drawings.

Referring now to the drawings in detail, the working parts of the machine are supported on a suitable frame, which includes a standard 15, a base 16 and an overhung extension 17. The main driving shaft 18 is journaled in suitable bearings carried by the standard 15, and upon this shaft are mounted the usual fast-and-loose pulleys 19 and 20 for receiving power from any suitable source of supply, while at the opposite end of said shaft the bevel pinion 21 is keyed or otherwise secured, and meshes with a bevel gear 22 secured on the vertical shaft 23, which is journaled in suitable bearings carried by the base 16 and the overhung extension 17. Loosely mounted on the shaft 23, and adapted to rotate independently thereof, is the sleeve 24, and upon said sleeve is secured the hub member 25 which carries preferably four can supports 26. Secured to the sleeve 24 above the hub member 25 is a second hub member 27, upon which are mounted a corresponding number of recessed guides 28, the purpose of which is to position the can bodies as they are delivered upon the supports 26 in the manner to be described hereinafter, and to assist in supporting them against lateral displacement. Secured to sleeve 24 above hub member 27 is still another hub member 29, which serves to support the seaming heads 30, of which there are the same number as the number of supports 26 on the hub member 25, four being shown in the drawings. Spur gears 31 and 32 are keyed or otherwise secured on shaft 23 above hub member 29, and spur gear 33 is loosely mounted on shaft 23 above gear 32. Spur pinion 34 is secured on shaft 23 above the overhung extension 17, and meshes with spur gear 35 which is secured on shaft 36 suitably journaled in bearings carried by the overhung extension 17. At the lower end of shaft 36 spur pinions 37 and 38 are secured thereon, pinion 38 meshing with gear 33 while pinion 37 meshes with spur gear 39 secured on vertical shaft 40 which is journaled in suitable bearings carried by standard 15, the disk 41, which is shown provided with four arms 42, being secured on shaft 40 slightly below the level of hub member 28. Spur gear 33 is connected with hub member 29 by means of a plurality of rigid brackets 43, all of which are located in such positions as to clear spur gears 31 and 32, so that spur gear 33 and hub member 29 rotate together when rotative movement is imparted to spur gear 33, and brackets 43 do not interfere with rotation of gears 31 and 32 at a different speed from that of gear 33 and hub member 29.

From the foregoing it will be apparent that rotation imparted to main driving shaft 18 through the medium of fast pulley 19 will be transmitted to shaft 23 by means of bevel gears 21 and 22, and spur gears 31 and 32 will be driven at the same speed as shaft 23. Spur pinion 34 will also be driven at the same speed, and through the medium of gear 35 and pinion 38 the large gear 33 will be caused to rotate at greatly reduced speed as compared with that of the units which are driven directly by shaft 23. Shaft 40 is driven from shaft 36 through the medium of spur pinion 37 and spur gear 39, and may therefore be caused to rotate at a speed different from that of the units driven directly by shaft 23 and from that of those units which are mounted on sleeve 24 and thus are driven from large gear 33. Since gear 33 is connected with hub member 29 through the medium of rigid brackets 43, and since hub member 29 is secured on sleeve 24, it is manifest that all of the units secured on said sleeve will rotate at the same speed as gear 33, these units including hub members 28 and 25.

Each of the cam supports 26 includes a substantially circular bearing plate 44, secured on a rod or shaft 45 which terminates in a sleeve 46 having roller 47 mounted thereon. Near its upper end shaft 45 is slidably mounted in a suitable bearing 48 carried by hub member 25, and at its lower end said shaft is secured in sleeve 46 which is slidably mounted in a suitable bearing 49, also carried by hub member 25. To provide for adjustment of the position of shaft 45 in sleeve 46, said shaft is secured to said sleeve by means of a split collar 50 which is rigidly connected to a flange 51' on said sleeve, and to prevent turning of sleeve 46 in bearing 49 said sleeve is provided with a lug 51 to which is secured a pin 52 slidably mounted in a suitable bearing in hub member 25. Thus shaft 45, sleeve 46 and pin 52 are free to move vertically, but said shaft and sleeve, and thus the bearing plate 44, are prevented by pin 52 from turning on their axis. The roller 47 is suitably mounted in a yoke or bracket 49', which is provided with a pintle 50' projecting into and fixed within the sleeve 46 on the shaft 26. The roller 47 therefore, follows the track 53, which is in the form of somewhat less than a half circle with shaft 23 as its center, is beveled or inclined at either end and is supported from standard 15. During a complete revolution of one of the rollers 47 around shaft 23 said roller will first be entirely out of engagement with track 53 and when it reaches said track will start at the lowest point thereof, will gradually travel upward until it arrives at the highest level, will remain at that height until the bevel or incline at the other end of the track is reached, will gradually descend to the lowest point thereof and thence out of engagement with said track and will remain thus out of engagement until the roller has returned to its starting point. The shape and dimensions of the circular track 53 may be varied to suit the conditions required for operation of the can-heading machine in the manner to be described hereinafter, and it is apparent that during a complete revolution of one of the rollers 47 around shaft 23 the height of sleeve 46, and thus that of shaft 45 and bearing plate 44, will be varied as the roller 47 travels from the lowest to the highest part of track 53 and thence back to the lowest part thereof.

Suitably secured to the hub member 27 are the four recessed jaws 28, the faces of which are so shaped and dimensioned as to form the arc of a circle of approximately the same radius as that of the can bodies intended to be operated upon by the machine. Hub member 27 is secured on sleeve 24 in such a position that each of the jaws 28 is located directly above one of the bearing plates 44 and in such relation thereto that the upper part of a can body supported on bearing plate 44 centrally thereof will be in contact with the recessed face of jaw 28 and thus will receive lateral support therefrom and be positioned laterally thereby. Provision is made for adjustment of the positions of jaws 28 on the hub member 27 in order to insure proper positioning of the can bodies on bearing plates 44, and for removal of said jaws for the purpose of substituting others in the event of change in the diameter of the can bodies to be engaged by said jaws. Hub member 27 is preferably secured on sleeve 24 in such a way that the height of said member, and thus that of jaws 28, above the bearing plates 44 may be varied to suit the height of the can bodies.

Each of the four seaming heads, which are supported by hub member 29, is located directly above one of the bearing plates 44 and on substantially the same vertical center line therewith. The central shaft 54 of each of said seaming heads extends upward through a suitable opening in the rim of gear 33 and the boss 55 thereon, said shaft being movable vertically in said opening. A bar 56 is secured to the upper end of shaft 54 by means of shoulder 57, nut 58 and pin 59, said shaft being held against turning relative to said bar by pin 59. In every respect the design, dimensions, functions and method of operation of all four of the seaming heads 30 are exactly similar, and a description of one of them will therefore suffice for all.

The spur pinion 60 is mounted on shaft 54 immediately below the rim of gear 33, and meshes with spur gear 32 which is secured on shaft 23. A sleeve 61 is rotatably mounted on shaft 54, and terminates at its lower end in an eccentric head 62 the purpose of which will be explained hereinafter, the upper end of said sleeve abutting against the extended rim 63 of bushing 64 of pinion 60 and said bushing in turn abutting against the rim of gear 33 at the point where shaft 54 passes therethrough, whereby vertical movement of sleeve 61 relative to gear 33 is prevented. A hub member 65 is slidably and non-rotatably secured on sleeve 61 near the upper end thereof and a short distance below pinion 60, said pinion and said hub member being provided on their adjacent faces with the gears 66 and 67, respectively, which are normally out of engagement but which are of the same pitch and design and adapted to mesh when brought into coöperative relation.

A sleeve 68 is rotatably mounted on sleeve 61, and terminates at its lower end in a circular flange 69 the purpose of which will be explained hereinafter, said sleeve 68 being also rotatably mounted in a suitable bearing 70 carried by hub member 29, which bearing preferably includes roller bearings 71. A spur pinion 72 is secured on sleeve 68 at the upper end thereof, and meshes with spur gear 31 secured on shaft 23. On the adjacent faces of hub member 65 and pinion 72 are provided the coöperating face cams 73 and 74, respectively, the designs and dimensions of said cams being such that during one complete rotation of hub member 65 relative to pinion 72 the high surface of cam 73 will first be in contact with the highest part of the surface of cam 74, which is of the same height throughout approximately half its length, will remain in contact at this uniformly high level throughout approximately a half revolution, will gradually descend to bevel or incline 75 leading from the highest to the lowest part of cam 74, said lowest part extending approximately one-quarter the length of said cam, and will remain in contact at this uniformly low level until cam 73 has returned to its starting point, at which point the high surface of the cam 74 will engage the shoulder 76 between the high and low surfaces of the cam 73, the latter then being in position to be again quickly raised above said high surface of the cam 74 in the manner hereinafter described, and said cams rotated relative to each other in the same direction as before. The foregoing statements as to the proportional parts of the total length of cam 74 which are at the highest and lowest levels, respectively, are intended merely as approximations, since it is manifest that these may be varied to suit the conditions of operation of this part of the cam-heading machine as described hereinafter.

A collar 77 is secured on sleeve 61 between hub member 65 and pinion 72, being connected with sleeve 61 by means of set screws 78, and being supported by a bearing 79 interposed between collar 77 and pinion 72. A bearing 80 is interposed between said pinion and the bearing 71 carried by hub member 29, and acts as a support for said pinion. At the lower end of shaft 54 is provided a chuck 81, rigidly mounted on said shaft and of the requisite shape and dimensions to adapt it to fit snugly into the depression which is commonly formed in can caps or covers prior to their delivery to the can-heading machine, and thus to position them and sustain them against the forces exerted thereupon during the seaming operation.

A strap 82 is fitted around hub member 65, being arranged loosely in a suitable groove 83 in said hub member to provide for rotation thereof relative to said strap. The lower ends of two rods 84 are secured to strap 82, and these rods extend upward through suitable openings in the rim of gear 33, being slidable therein, and their upper ends are secured to bar 56 near the respective ends thereof and at opposite sides of shaft 54. On each of the rods 84 a coil spring 85 is provided which extends between strap 82 and the rim of gear 33, said springs being normally somewhat compressed and being adapted for greater compression when strap 82 is advanced more closely to gear 33. Two rods 86 are secured to the rim of gear 33, one at either side of shaft 54 and between said shaft and the rods 84, and said rods pass through suitable openings in bar 56, being slidable therein, and are provided at their upper ends with suitable heads 87 of larger diameter than the openings in bar 56 through which rods 86 pass, whereby said rods serve to limit the distance that bar 56 is movable away from gear 33.

In the case of each of the seaming heads the circular flange 69 at the lower end of sleeve 68 serves as a support for the hub member 88, said flange being slidably mounted in a suitable groove 89 formed in said hub member and being retained therein by a screw-threaded ring 90, and the sliding motion of said hub member relative to said flange being limited to radial motion by means of the pin 91 which engages a radial slot 92 in flange 69. Rigidly secured to hub member 88 is the supporting ring 93 for the seaming rollers 94 and 95, which are of the usual construction and configuration and both of which are mounted at the same side of plate 93. A counterbalance 96 may be rigidly secured to hub member 89 at the side opposite that on which the seaming rollers are mounted, and assists in regulating the rotation of supporting plate 93 and thus of the seaming rollers carried thereby. The hub member 88 is rotatably mounted on the eccentric head 62 which forms the lower end of sleeve 61, and the manner in which said eccentric head coöperates with the supporting member for the seaming rollers to advance said rollers successively toward chuck 81 and to retract them therefrom is fully shown and described by me in a co-pending application filed July 5, 1910, Serial No. 570,343. As set forth in said co-pending application, when sleeve 61 is rotated relative to sleeve 68, the eccentric head 62 will operate to impart what may be said to be a compound movement to the hub member 88 and therefore to the tool carrying ring 93, this compound movement being that of lineal reciprocating in the general direction of the slot 92 in the flange 69 and transverse oscillation about the pin 91 as a center, this movement operating in the manner described in my co-pending application aforesaid to advance the seaming rollers 94 and 95 successively toward chuck 81 and successively retract the same therefrom after the seaming operation. When the can-heading machine is in operation, gears 31 and 32 which are secured on shaft 23 are caused to rotate continuously at uniform speed, and since gear 31 meshes with pinion 72 which is secured on sleeve 68, said sleeve is caused to rotate uniformly and continuously, carrying with it the supporting plate 93 for the seaming rollers 94 and 95 and the seaming rollers themselves. Pinion 60 meshes with gear 32 and is driven uniformly and continuously thereby, said pinion being mounted loosely on shaft 54 and being normally an idler in so far as transmitting motion to any other unit is concerned, but since hub member 65 is secured on sleeve 61, and since gear 66 on pinion 60 is adapted to mesh with gear 67 on hub member 65, it is only necessary to bring said gears into engagement in order to cause sleeve 61 to be rotated at the same speed as pinion 60. Under such conditions, with sleeve 61 rotated at the same speed as pinion 60 and sleeve 68 rotated at the same speed as pinion 72, it is necessary that said pinions shall be driven at different speeds in order to produce rotation of one of said sleeves relative to the other, and this purpose is accomplished by so proportioning gear 32 relative to pinion 60 and gear 31 relative to pinion 72 as to form a set of difential gears, the difference in the speeds of rotation of the two pinions being made such as to conform to the requirements of operation of the can-heading machine in the manner to be described hereinafter.

The pinion 37 and gear 39 are preferably so proportioned that shaft 40 and disk 41 thereon carrying the arms 42 are caused to rotate at the same speed as the sleeve 24, and the position of said arms is so fixed relative to that of bearing plates 44 that when cans are placed successively upon the receiving plate 97 in position to be engaged by the arms 42, each of said arms will move a can from said receiving plate into position on one of the bearing plates 44 as it passes the receiving plate in its revolution around shaft 23, the cans being directed during such movement by a suitable guide 98 until they are pushed by the arms 42 into contact with the positioning and supporting jaws 28 carried by hub member 27.

A discharge plate 99 is supported by a standard 100, or in any other suitable manner, in position to receive the cans when they are ready to be discharged from the can-heading machine after completion of the seaming operation, and on said plate is mounted a deflector 101 which is adapted to cause the seamed cans to move from the bearing plates 44 to discharge plate 99 as said bearing plates pass said discharge plate in their revolution around shaft 23.

The height of bearing plates 44 is regulated according to the height of the can body so as to bring the caps or covers into the desired position relative to the seaming mechanism, such regulation being provided for, as described hereinbefore, by the manner in which shafts 45 are mounted in sleeves 46. The height of receiving plate 97 and that of discharge plate 99 is then regulated so as to be the same as that of bearing plates 44 when they are in their lowest position,—that is, when rollers 47 are out of engagement with track 53 and lugs 51 of sleeves 46 rest upon that part of hub member 25 in which pins 52 are mounted, thus supporting bearing plates 44 at a predetermined height.

The operation of my improved can-heading machine will readily be understood from the following description: The filled cans, with their covers in place and either temporarily secured to their respective can bodies or loosely positioned thereon, are delivered successively upon receiving plate 97 in position to be engaged by arms 42, the manner of such delivery being immaterial except that it should preferably be automatic and at a uniform rate which will be so rapid as not to interfere with the operation of the machine in the manner intended or limit the output capacity thereof. As each of the can supports 26 passes receiving plate 97 a can is moved therefrom by one of the arms 42 and is directed by guide 98 into the desired position on bearing or supporting plate 44, and into contact with the recessed face of jaw member 28. After the supporting plate has passed clear of receiving plate 97, roller 47 comes in contact with the lowest part of the beveled or inclined surface of track 53 and advances to the high level of said track, which is of sufficient length to retain said roller uniformly at its highest elevation during that portion of a revolution of the seaming mechanism which is intended to be devoted to the seaming operation. As roller 47 advances to its highest position, bearing plate 44 is elevated correspondingly, the can body with its cap or cover in place thereon is raised into engagement with chuck 81, which enters the depression in the cap or cover, and the chuck is forced upward a distance which is regulated by the design of track 53 to correspond approximately with the clearance between pinion 60 and hub member 65. Such upward movement of chuck 81, and therefore of shaft 54 on which it is secured, causes bar 56 to be moved upward from its normal position relative to gear 33, thereby compressing springs 85 on rods 84 and through the medium of said rods and strap 82 pulling hub member 65 upward and bringing gear 67 into mesh with gear 66. As soon as gear 67 engages gear 66, sleeve 61 is caused to rotate relative to sleeve 68 by the operation of the differential gearing described hereinbefore, and this produces two results—namely, as soon as said relative rotation begins the high surface of cam 73 is advanced into engagement with the high surface of cam 74 at the substantially vertical shoulder 76, said high surface being of sufficient length so that the high surface of cam 73 will remain in engagement therewith throughout the seaming operation, and eccentric head 62 operates to cause advancement of the seaming rollers 94 and 95 successively into engagement with the can head. The differential gears are so proportioned that during that portion of a complete revolution of the seaming mechanism which is intended to be devoted to the seaming operation one rotation of sleeve 61 relative to sleeve 68 is caused, the seaming rollers are gradually brought successively into full engagement with the can head and then retracted therefrom and the high surface of cam 73 remains in contact with the high surface of cam 74 during the seaming operation then passes down the bevel or incline 75 to the low surface of cam 74. As the single rotation of sleeve 61 relative to sleeve 68 nears completion, roller 47 passes from the high level of track 53 down the incline at the end thereof and out of engagement therewith, thus lowering the bearing plate 44 to its normal height, and uniformly therewith the high surface of cam 73 passes from the high to the low surface of cam 74, the downward movement of cam 73 being assisted by the tendency of the compressed springs 85 to force hub member 65 downward and any downward movement of hub member 65 being manifestly accompanied by corresponding downward movement of shaft 54 and chuck 81. Immediately upon the release of gear 67 from engagement with gear 66, at the completion of one revolution of sleeve 61 relative to sleeve 68, the end of the high surface of cam 73 engages the shoulder 76 of cam 74, and further rotation of said sleeves relative to each other is checked until a can is again interposed between bearing plate 44 and chuck 81 and said chuck and its shaft are forced upward as before, thus forcing hub member 65 upward until gear 67 is in mesh with gear 66 and the high surface of cam 73 is in position for engagement with the high surface of cam 74. It will be noted that as soon as the high surfaces of the said cams are brought into engagement at the beginning of the rotation of sleeve 61 relative to sleeve 68, shaft 54 is supported in its raised position, and the tendency of the springs 85 to react is resisted, by hub member 65, thus relieving the can and its cover of the downward pressure first exerted thereupon when they are used as the medium for forcing chuck 81 upward as bearing plate 44 is elevated by advancement of roller 47 to the high level of track 53.

After the seaming operation has been completed, and chuck 81 and bearing plate 44 with the seamed can thereon have moved down to their normal positions, further revolution of said units around shaft 23 will bring the seamed can into contact with the deflector 101, thereby causing said can to be moved from its position on bearing plate 44 to the discharge plate 99.

Manifestly my improved can-heading machine is adapted for continuous performance of successive seaming operations in the manner just described for a single one of such operations, and for performance thereof at a very rapid rate. It is also manifest that failure of one or more of the plurality of seaming heads, or of one or more of the plurality of supports for the assembled parts of the cans, to operate, for any reason, need not interfere with operation of other parts of the machine. The use of the assembled parts of a can as a medium for actuating the operation of the seaming heads greatly simplifies the construction of the can-heading machine and the operation thereof, and this I regard as being one of the most important of the numerous advantages connected with the present invention.

Many modifications of minor details of my improved can-heading machine will doubtless readily suggest themselves to those skilled in this art, and I therefore do not desire to limit my invention to the specific construction herein shown and described.

I claim as new and desire to secure by Letters Patent:

1. In a can heading machine, the combination, with a traveling support for the assembled parts of a can to be headed, correspondingly traveling heading mechanism, and means for intermittently effecting a coöperative relationship therebetween to sustain and head an advancing can in transit, said heading mechanism operating continuously and the tools thereon being out of work-engaging positions, of disconnected means connectible to advance said tools to work-engaging positions, and means rendered operable through the medium of can parts interposed between said support and said mechanism to connect said tool-advancing means.

2. In a can heading machine, the combination, with a traveling support for the assembled parts of a can to be headed, correspondingly traveling heading mechanism, and means for intermittently effecting a coöperative relationship therebetween to sustain and head an advancing can in transit, said heading mechanism operating continuously and the tools thereon being out of work-engaging positions, of disconnected means connectible to advance said tools to work-engaging positions, means rendered operable through the medium of can parts interposed between said support and said mechanism to connect said tool-advancing means, and means independent of the means for establishing such connection to continue the same until completion of the heading operation.

3. In a can heading machine, the combination, with a traveling support for the assembled parts of a can to be headed, and heading mechanism located essentially above and traveling with said support, of means for raising said support in transit to position said parts in sustained condition in said heading mechanism, said heading mechanism operating continuously and the tools thereon being out of work-engaging positions, disconnected means connectible to advance said tools to work-engaging positions, and means rendered operable through the medium of can parts interposed between said support and said mechanism to connect said tool-advancing means.

4. In a can heading machine, the combination, with a traveling support for the assembled parts of a can to be headed, and heading mechanism located essentially above and traveling with said support, of means for raising said support in transit to position said parts in sustained condition in said heading mechanism, said heading mechanism operating continuously and the tools thereon being out of work-engaging positions, disconnected means connectible to advance said tools to work-engaging positions, means rendered operable through the medium of can parts interposed between said support and said mechanism to connect said tool-advancing means, and means independent of the means for establishing such connection to continue the same until completion of the heading operation.

5. In a can heading machine, the combination, with a revolving support for the assembled parts of a can to be headed, correspondingly revolving heading mechanism, and means for intermittently effecting a coöperating relationship therebetween to sustain and head an advancing can in transit, said heading mechanism operating continuously and the tools thereon being out of work-engaging positions, of disconnected means connectible to advance said tools to work-engaging positions, and means rendered operable through the medium of can parts interposed between said support and said mechanism to connect said tool-advancing means.

6. In a can heading machine, the combination, with a revolving support for the assembled parts of a can to be headed, correspondingly revolving heading mechanism, and means for intermittently effecting a coöperative relationship therebetween to sustain and head an advancing can in transit, said heading mechanism operating continuously and the tools thereon being out of work-engaging positions, of disconnected means connectible to advance said tools to work-engaging positions, means rendered operable through the medium of can parts interposed between said support and said mechanism to connect said tool-advancing means, and means independent of the means for establishing such connection to continue the same until completion of the heading operation.

7. In a can heading machine, the combination, with a revolving support for the assembled parts of a can to be headed, and heading mechanism located essentially above and revolving with said support, of means for raising said support in transit to position said parts in sustained condition in said heading mechanism, said heading mechanism operating continuously and the tools thereon being out of work-engaging positions, disconnected means connectible to advance said tools to work-engaging positions, and means rendered operable through the medium of can parts interposed between said support and said mechanism to connect said tool-advancing means.

8. In a can heading machine, the combination, with a revolving support for the assembled parts of a can to be headed, and heading mechanism located essentially above and revolving with said support, of means for raising said support in transit to position said parts in sustained condition in said heading mechanism, said heading mechanism operating continuously and the tools thereon being out of work-engaging positions, disconnected means connectible to advance said tools to work-engaging positions, means rendered operable through the medium of can parts interposed between said support and said mechanism to connect said tool-advancing means, and means independent of the means for establishing such connection to continue the same until completion of the heading operation.

9. In a can heading machine, the combination, with a traveling support for the assembled parts of a can to be headed, correspondingly traveling heading mechanism, said mechanism operating continuously and the tools thereon being out of work-engaging positions, and disconnected means connectible to advance said tools to work-engaging positions, of means for intermittently effecting a coöperative relationship between said support and said heading mechanism in transit to position said can parts in the latter and sustain the same therein against the forces of the heading operation, said tool-advancing means being rendered operable through the medium of the can parts interposed between said support and said mechanism to connect said tool-advancing means, and independent means for continuing such connection and restoring said condition of disconnection upon completion of the heading operation.

10. In a can heading machine, the combination, with a traveling support, means for delivering thereto and positioning thereon the assembled parts of a can to be headed, correspondingly traveling heading mechanism, and means for intermittently effecting a coöperating relationship between said support and said mechanism to sustain and head an advancing can in transit, said heading mechanism operating continuously and the tools thereon being out of work-engaging positions, of disconnected means connectible to advance said tools to work-engaging positions, and means rendered operable through the medium of can parts interposed between said support and said mechanism to connect said tool-advancing means, and means for ejecting the headed can.

11. In a can heading machine, the combination, with a traveling support, means for delivering thereto and positioning thereon the assembled parts of a can to be headed, correspondingly traveling heading mechanism, and means for intermittently effecting a coöperative relationship between said support and said mechanism to sustain and head an advancing can in transit, said heading mechanism operating continuously and the tools thereon being out of work-engaging positions, of disconnected means connectible to advance said tools to work-engaging positions, means rendered operable through the medium of can parts interposed between said support and said mechanism to connect said tool-advancing means, means independent of the means for establishing such connection to continue the same until completion of the heading operation, and means for ejecting the headed can.

12. In a can heading machine, the combination, with a series of traveling supports for the assembled parts of cans to be headed, a corresponding series of individual heading mechanisms traveling with said supports, and means for successively effecting coöperative relationship therebetween to successively sustain and head an advancing can in transit, each heading mechanism operating continuously and the tools thereon being out of work-engaging positions, of disconnected means connectible to advance said tools to work-engaging positions, and means rendered operable through the medium of can parts interposed between said support and said mechanism to connect said tool-advancing means.

13. In a can heading machine, the combination, with a series of traveling supports for the assembled parts of cans to be headed, a corresponding series of individual heading mechanisms traveling with said supports, and means for successively effecting coöperative relationship therebetween to successively sustain and head an advancing can in transit, each heading mechanism operating continuously and the tools thereon being out of work-engaging positions, of disconnected means connectible to advance said tools to work-engaging positions, means rendered operable through the medium of can parts interposed between said support and said mechanism to connect said tool-advancing means, and means independent of the means for establishing such connection to continue the same until completion of the heading operation.

14. In a can heading machine, the combination, with a series of traveling supports for the assembled parts of cans to be headed, a corresponding series of individual heading mechanisms located essentially above and traveling with said supports, of means for raising each support in turn in transit to position the can parts thereon in sustained condition in one of said heading mechanisms, each heading mechanism operating continuously and the tools thereon being out of work-engaging positions, disconnected means connectible to advance said tools to work-engaging positions, and means rendered operable through the medium of can parts interposed between said support and said mechanism to connect said tool-advancing means.

15. In a can heading machine, the combination, with a series of traveling supports for the assembled parts of cans to be headed, a corresponding series of individual heading mechanisms located essentially above and traveling with said supports, of means for raising each support in turn in transit to position the can parts thereon in sustained condition in one of said heading mechanisms, each heading mechanism operating continuously and the tools thereon being out of work-engaging positions, disconnected means connectible to advance said tools to work-engaging positions, means rendered operable through the medium of can parts interposed between said support and said mechanism to connect said tool-advancing means, and means independent of the means for establishing such connection to continue the same until completion of the heading operation.

16. In a can heading machine, the combination, with a series of revolving supports for the assembled parts of cans to be headed, a corresponding series of revolving individual heading mechanisms, and means for successively effecting coöperative relationship between said supports and mechanisms to sustain and head each can in turn in transit, each heading mechanism operating continuously and the tools thereon being out of work-engaging positions, of disconnected means connectible to advance said tools to work-engaging positions and means rendered operable through the medium of can parts interposed between said support and said mechanism to connect said tool-advancing means.

17. In a can heading machine, the combination, with a series of revolving supports for the assembled parts of cans to be headed, a corresponding series of revolving individual heading mechanisms, and means for successively effecting coöperative relationship between said supports and mechanisms to sustain and head each can in turn in transit, each heading mechanism operating continuously and the tools thereon being out of work-engaging positions, of disconnected means connectible to advance said tools to work-engaging positions, means rendered operable through the medium of can parts interposed between said support and said mechanism to connect said tool-advancing means, and means independent of the means for establishing such connection to continue the same until completion of the heading operation.

18. In a can heading machine, the combination, with a series of revolving supports for the assembled parts of cans to be headed, a corresponding series of individual heading mechanisms located essentially above and revolving with said supports, of means for raising each support in turn in transit to position the can parts thereon in sustained condition in one of the traveling heading mechanisms, each of said mechanisms operating continuously and the tools thereon being out of work-engaging positions, disconnected means connectible to advance said tools to work-engaging positions, and means rendered operable through the medium of can parts interposed between said support and said mechanism to connect said tool-advancing means.

19. In a can heading machine, the combination, with a series of revolving supports for the assembled parts of cans to be headed, a corresponding series of individual heading mechanisms located essentially above and revolving with said supports, of means for raising each support in turn in transit to position the can parts thereon in sustained condition in one of the traveling heading mechanisms, each of said mechanisms operating continuously and the tools thereon being out of work-engaging positions, disconnected means connectible to advance said tools to work-engaging positions, means rendered operable through the medium of can parts interposed between said support and said mechanism to connect said tool-advancing means, and means independent of the means for establishing such connection to continue the same until completion of the heading operation.

20. In a can-heading machine, the combination, with a plurality of vertically-reciprocatory can-supports revoluble about a common center, of a series of seaming-rollers also revoluble about a common center and normally out of engagement with the cans on said supports, a pair of seaming-rollers being disposed over each of said can-supports, means for advancing the seaming-rollers into operative relation with the cans, means for successively raising said can-supports so that the cans are in proximity with said seaming-rollers, vertically-reciprocatory chucks movable upward, through the medium of said cans, upon raising of said can-supports, and clutch-mechanism, operative upon raising of said chucks, to control said means for advancing the seaming-rollers into operative relation with the cans.

In testimony of the foregoing, I have hereunto set my hand in the presence of two witnesses:

JULIUS BRENZINGER.

Witnesses:
W. L. MANN,
J. H. MACBRIDE.